Figure 3:
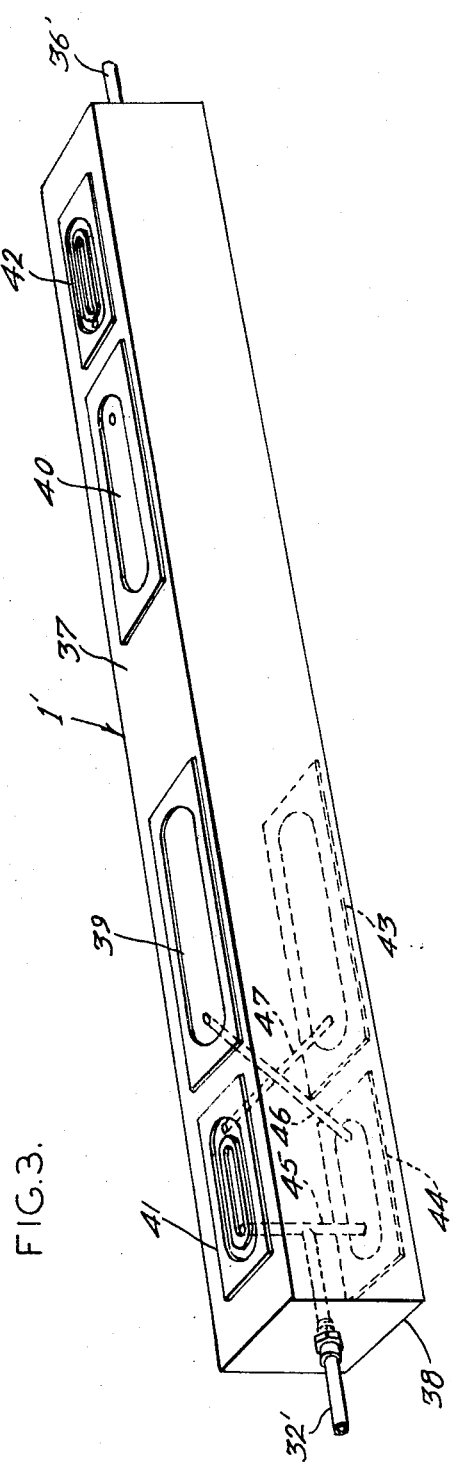

United States Patent [19]
Hedberg

[11] 3,754,799
[45] Aug. 28, 1973

[54] MOVABLE MACHINE ELEMENT SUPPORTED WITH THE AID OF A GAS OR FLUID BEARING
[75] Inventor: Olof Johan Gerhard Hedberg, Lidkoping, Sweden
[73] Assignee: Lidkopings Mekaniska Verkstads AB, Lidkoping, Sweden
[22] Filed: Nov. 18, 1971
[21] Appl. No.: 200,012

[52] U.S. Cl. .................................. 308/5 R, 308/9
[51] Int. Cl. ............................................. F16c 17/00
[58] Field of Search ........................... 308/5, 9, 122

[56] References Cited
UNITED STATES PATENTS

| 3,338,643 | 8/1967 | Wilcock | 308/122 |
|---|---|---|---|
| 2,788,862 | 4/1957 | Langer | 308/9 |
| 3,476,444 | 11/1969 | Dunfet | 308/5 R |
| 3,484,064 | 12/1969 | Koenig | 308/5 R |
| 3,067,979 | 12/1962 | Cox | 308/5 R |
| 3,582,159 | 6/1971 | Uhtenwoldt | 308/5 R |

Primary Examiner—Charles J. Myhre
Assistant Examiner—R. H. Lazarus
Attorney—Dexter N. Shaw, Eugene E. Renz, Jr. et al.

[57] ABSTRACT

Movable machine element such as a rotating shaft or a reciprocating rod with an arbitrary cross section which partly or entirely is supported with the aid of a gas or fluid bearing or a combination of both in such a way that the medium, gas or fluid, before it forms a bearing or a slide cushion passes a throttle, characterized in that each throttle is formed by a part of a surface of the element, which surface is supported at the surface facing it by means of a gas or fluid cushion, and by a part of the last-mentioned surface, which last-mentioned part faces the first-mentioned part.

6 Claims, 8 Drawing Figures

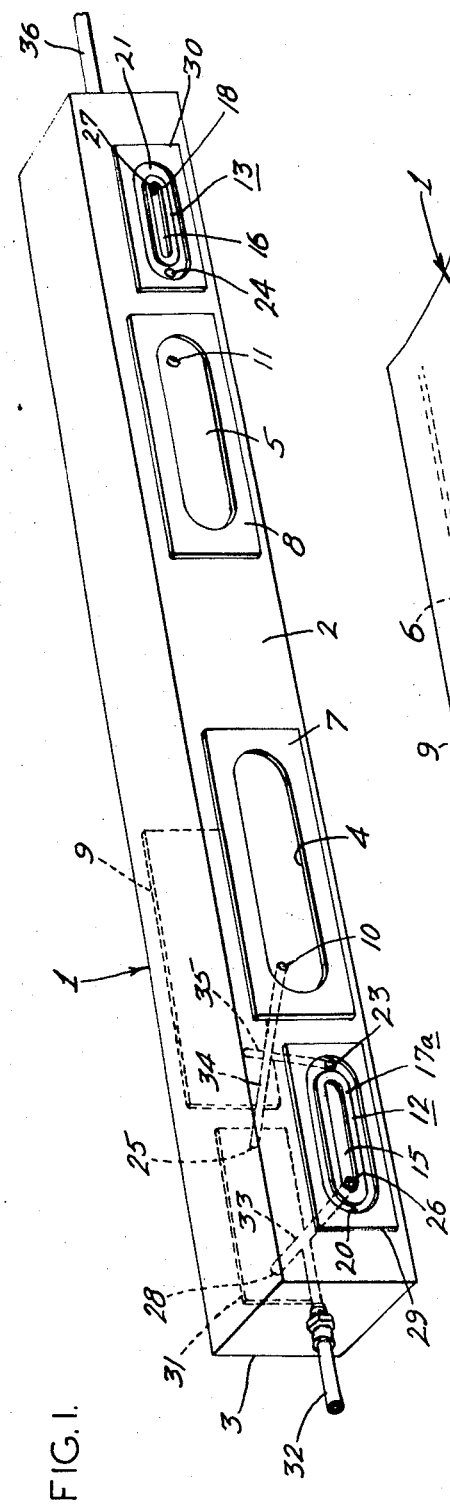
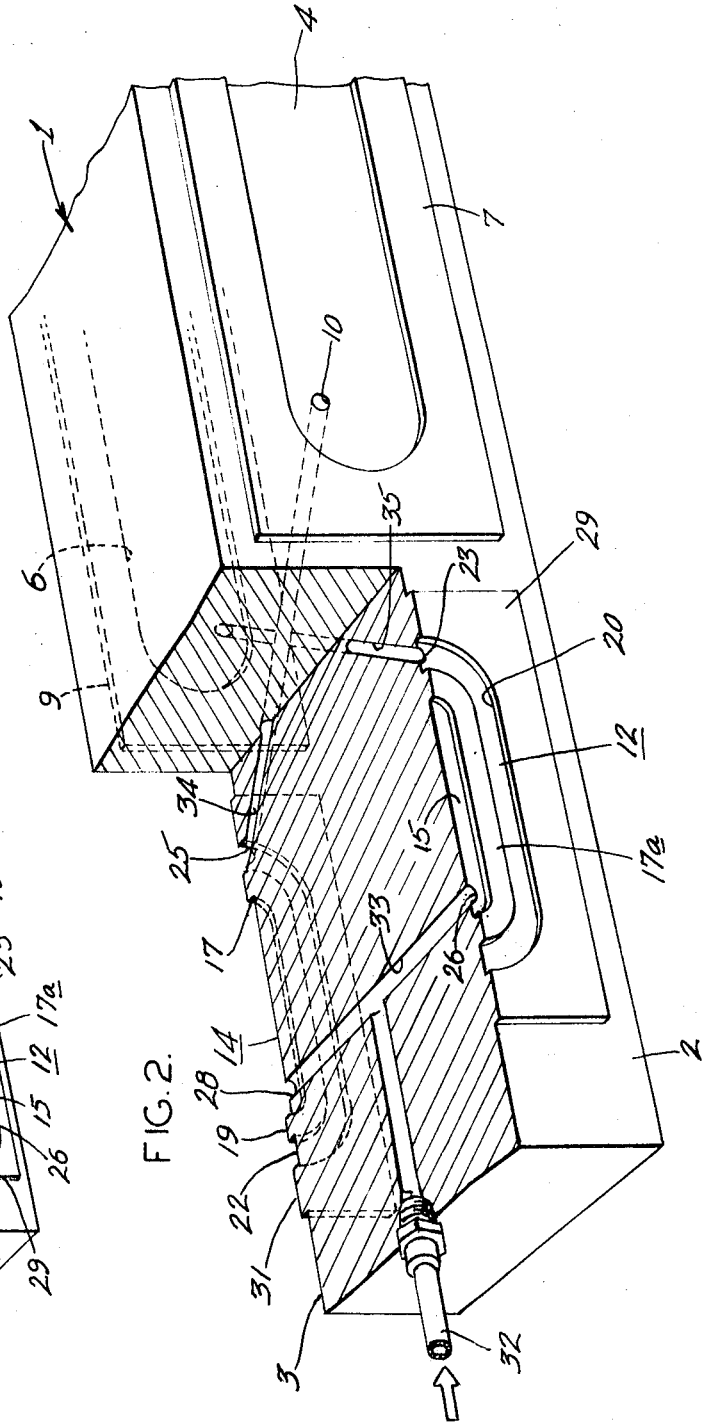

Patented Aug. 28, 1973　　3,754,799

4 Sheets-Sheet 2

MOVABLE MACHINE ELEMENT SUPPORTED WITH THE AID OF A GAS OR FLUID BEARING

The present invention relates to a movable machine element, which can consist of a rotating shaft or a reciprocating rod with an arbitrary cross section, which element is partly or entirely supported with a gas or fluid bearing or a combination of both, in such a way that the medium, gas or fluid, passes a throttle before it forms a bearing layer or a slide cushion. If the medium is a fluid, the bearing is called a hydrostatic bearing, and if the medium is gas, it is called an aerostatic bearing. If, for instance, the machine element consists of a shaft, the bearing consists of two or three parts, each of which forms a slide cushion. Through the arrangement with throttles, the three bearing parts cause the shaft to take a centered position. At the slightest deviation therefrom, the three bearing parts coact so that said centering is achieved. If the movable machine element consists of a reciprocating rod with, for instance, a rectangular cross section, and the rod runs in a groove with four walls, the bearings are arranged in such a way that they act upon two opposite sides, so that the rod will be centered in relation to these sides. As the rod has four sides, this involves that the rod will be centered in two directions of movement. Such a rod can be used in order to facilitate the reciprocating movement of a work table, which can take place in various machine tools. The work table is then fastened in some way or other to two rods of said kind.

The above-mentioned bearings, which are formed by the medium of gas or fluid, have been obtained only after a passage through a throttle. Hitherto, such throttles have been achieved through the use of fixed throttles of the types capillary tube, screw in cylindrical hole, where the medium passes through the threads, the SKF standard washer throttle, where the medium passes through a slot, for instance. In addition to these, there have been variable throttles, which have contained movable parts (see Philips patent, Hearld etc). By using fixed throttles of the capillary type, for instance, or variable throttles, it has been possible to obtain throttles which, to a certain extent, can be adjusted. Moreover, the throttles are very sensitive to foreign matter, which can clog a throttle completely, involving a risk for a breakdown of the machine. Further, it is generally necessary to drill long and inconvenient channels for conveying the throttled medium to its slide cushion (hydrostatic pocket). Usually the throttles are separate components, located outside of the machine element.

The purpose of the present invention is to avoid the above-mentioned drawbacks as regards the designing of throttles, and this is achieved in that the envelope surface of the movable machine element and the surface or surfaces which are opposite the envelope surface of the machine element are utilized in such a way that these opposite surfaces are allowed to cooperate toward forming the throttles required. In principle, a throttle is achieved in such a way that, on the machine element, a small pocket is created, which is enclosed by a peripheral raised section, or "land", the upper surface of which is arranged to be close to the opposite surface. Outside of said peripheral land a peripheral pocket is arranged, and outside of the peripheral pocket, in turn, there is a surface which is also very close to the opposite surface. If now a medium is fed to the pocket, the medium must pass by the peripheral land before it reaches the peripheral pocket, and if this is provided with a pocket at which a slide cushion is formed, it will prove that the peripheral land together with the opposite surface will form a throttle when the medium flows through the slot which is formed by the peripheral land being close to the opposite side and as the surface outside of the peripheral pocket forms a seal.

The outlet from the peripheral pocket can consist of a drilled channel, and the same applies as regards the inlet channel. It should thus be obvious that the throttle has been formed without any movable parts whatsoever. The throttle is regulated only by the distance from the peripheral land to the opposite surface.

The surfaces that coact with the opposite surfaces in a throttle according to the present invention have small dimensions in relation to the surfaces where the slide cushions are formed.

Normally, a throttle according to the present invention is arranged near a pocket where a slide cushion is to be formed. This pair, throttle and pocket, coacts with another pair of throttle and pocket where the slide cushion has been formed by the outlet of the throttle in one of the pairs being connected with the pocket in which the slide cushion is formed in the other pair. The coacting pairs are located in such a way in relation to each other on the machine element that they coact in the alignment of the machine element in relation to the surrounding guiding member.

If a bar with a rectangular cross section is used, a pair consisting of a throttle and a pocket for a slide cushion can be arranged on one surface of the bar, and coact with a corresponding pair arranged on the opposite surface, and these two surfaces of the bar are then located between two walls. By having one or several of such coacting pairs arranged along the length of the bar and on said two surfaces, good guidance of the bar is obtained between said two surrounding guide surfaces. On the other hand, if it is desired to avoid a so-called "drawer" effect, two coacting pairs can be arranged so that there will be one at either end on the same surface of the elongate member.

If the elongate member consists of a shaft that rotates, a number of pairs can be arranged one after the other along a peripheral line on the envelope surface of the shaft, and thereby connect throttles and pockets which form slide cushions in such a way that a centering of the shaft in relation to the surrounding guiding member is obtained.

The most natural medium to use for forming a slide cushion would be oil, but it should be obvious, as previously mentioned, that any medium whatsoever that has properties for forming a slide cushion can be used.

Further characteristic features of the present invention will be noted from the following claims.

Figure 4:
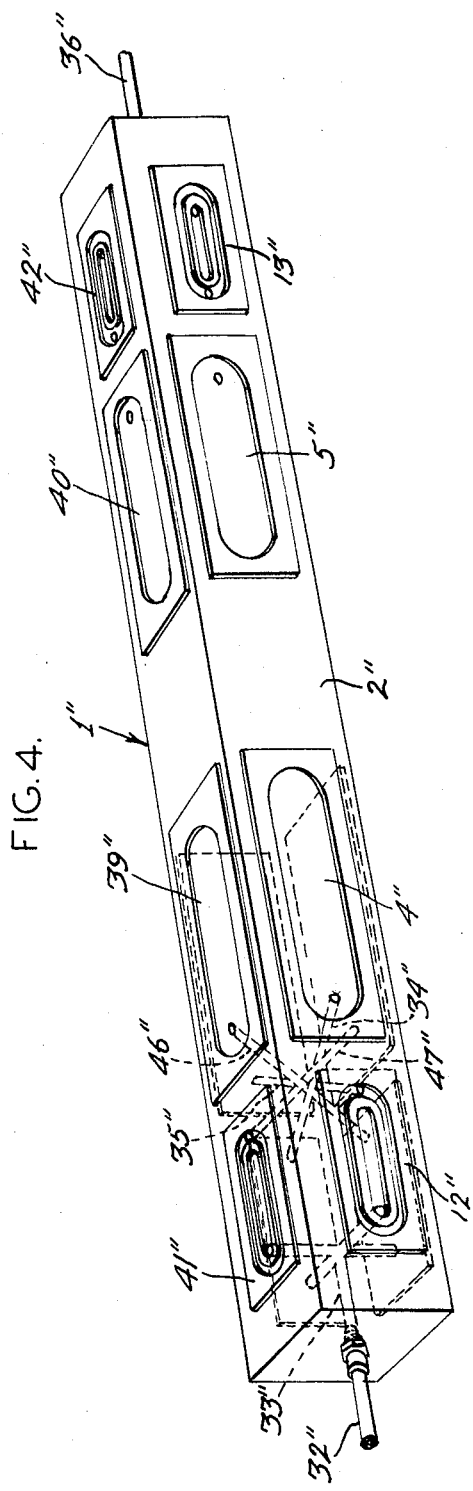
Figure 5:
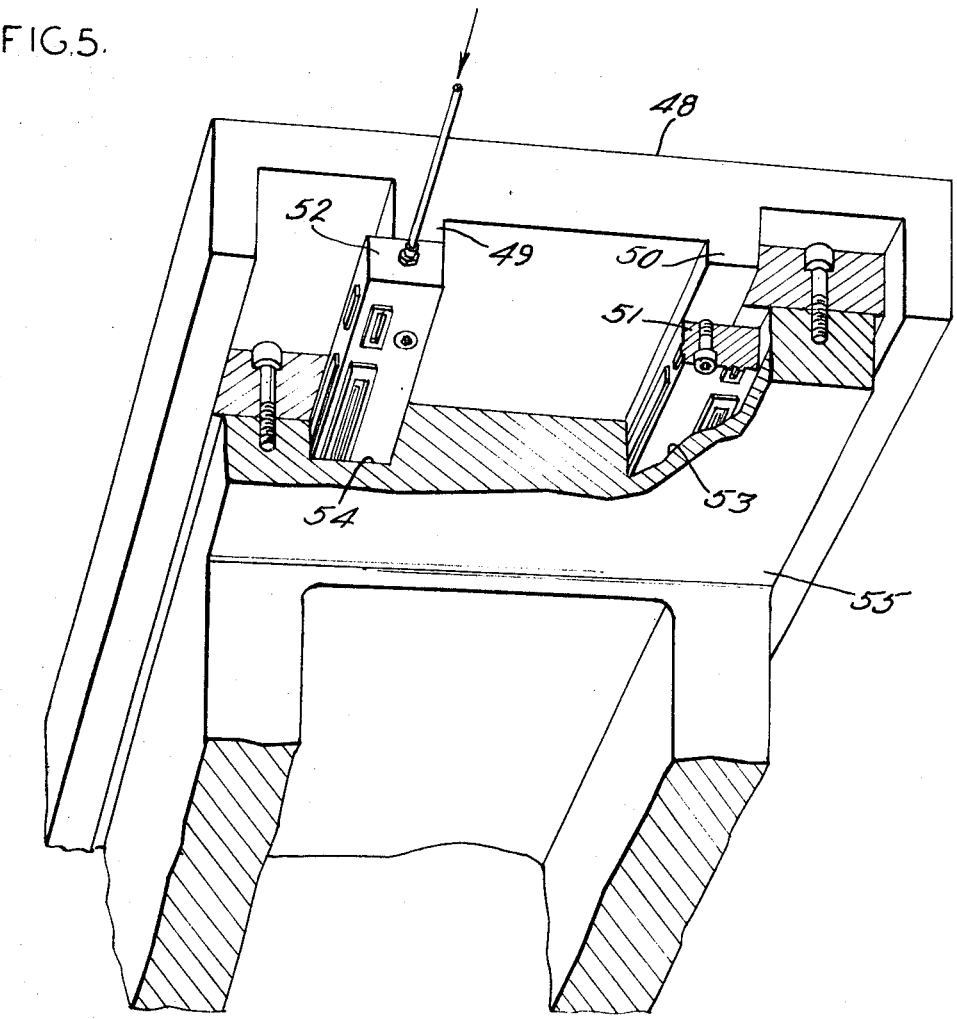
Figure 6:
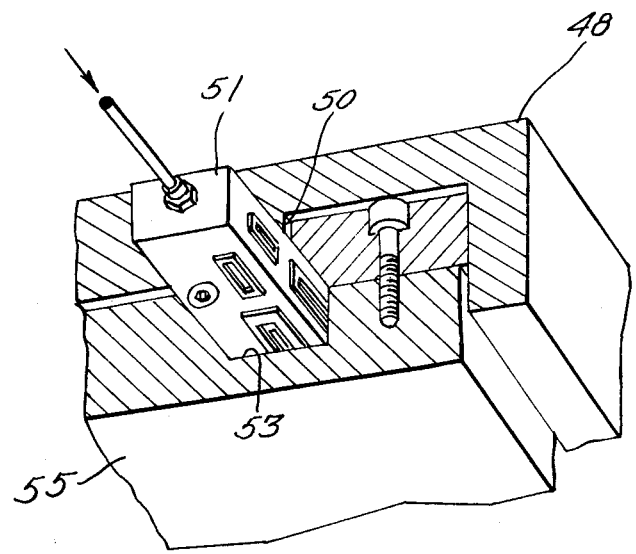
Figure 7:
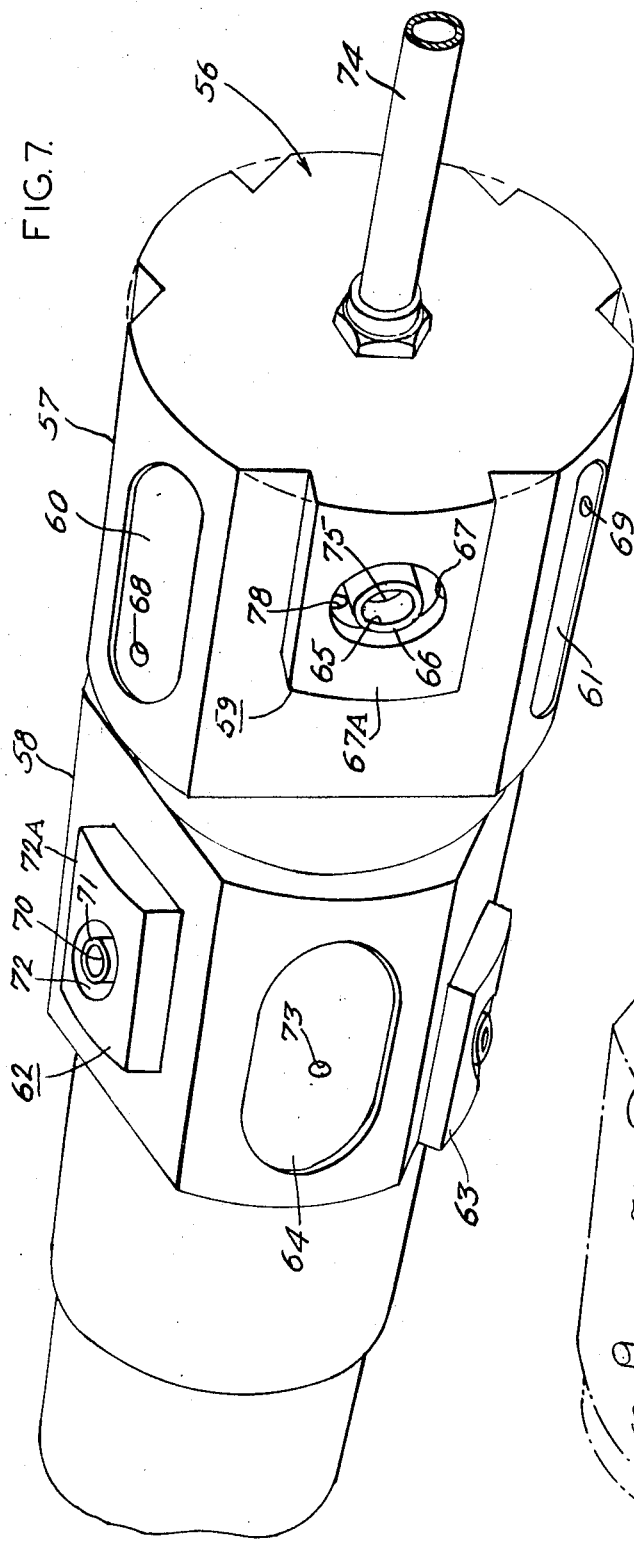
Figure 8:
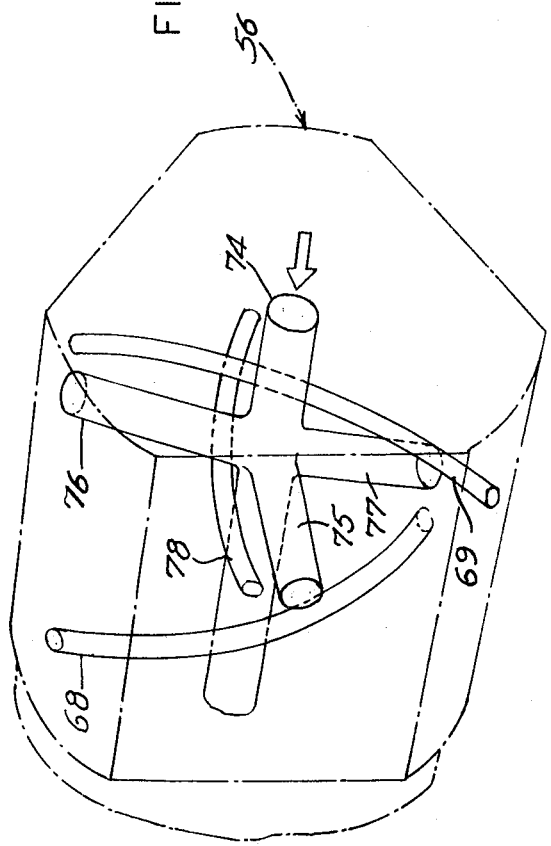

Examples of embodiments according to the present invention will be described with reference to the attached six drawings, in which:

FIG. 1 shows a parallelepipedical machine element, provided with throttles according to the present invention and pockets for forming of slide cushions, which are arranged on two opposite vertical sides, in which FIG. 2 shows a cut-away of the front part of the parallelepipedical element, in which FIG. 3 shows a machine element of the same kind as the one shown in FIG. 1, but having the throttles and pockets for forming of slide cushions arranged on the opposite horizontal sides, in which FIG. 4 shows a machine element provided with throttles and pockets for forming of slide cushions on all four sides, the pockets and throttles on one side then coating with the corresponding members on the opposite side, in which FIG. 5 shows a practical application of a machine element according to the foregoing figures, the machine element then functioning as a guide rule for a reciprocating table, for instance for a machine tool, in which FIG. 6 shows a part of FIG. 5 enlarged, in which FIG. 7 shows a more or less cylindrical member which has throttles and pockets for forming of slide cushions arranged in pairs after one another along the periphery, and in which FIG. 8 shows schematically the channels for one of the peripheral series of throttles and pockets.

In FIGS. 1 and 2, 1 is an elongate parallelipipedical element, which is usually called a rule. This element has two vertical walls 2 and 3. The element is provided with four pockets 4, 5 and 6. The fourth pocket is not visible. This pocket coacts with the pocket 5, while the pockets 4 and 6 coact with each other. Each of the pockets mentioned are surrounded by a flat surface 7, 8 and 9, respectively. These surfaces form raised sections in relation to the walls 2 and 3, and are intended to coact with vertical walls in a guide groove for the element 1. Each of the pockets has an inlet hole. This has been given the reference designation 10 for pocket 4, the reference designation 11 for pocket 5. To the left of the pocket 4 a throttle part 12 is located, and to the right of the pocket 5 a throttle part 13 is located. In front of the pocket 6 there is also a throttle part 14. The pocket on side 3 of the element, which coacts with the pocket 5, also has a throttle, not shown, in front of it. The throttle part 12 consists of a pocket 15. The throttle part 13 also has a pocket 16, and the same applies to the throttle part 14, which has a pocket 17. Each of said pockets is surrounded by a raised section, or land, which has a flat upper surface, and which is on the same level as the flat surfaces surrounding the adjacent pocket, which forms the slide cushion. Said raised sections, as regards the throttle parts 12, 13 and 14, which constitute the actual throttle, have been fiven the reference designations 17A, 18 and 19. The peripheral land in each of the throttle parts is surrounded by a peripheral pocket 20, 21 and 22, respectively. The lastmentioned peripheral lands, in turn, are each surrounded by a surface which constitutes a seal for the peripheral pocket, and have the reference designations 29, 30 and 31, respectively. The last-mentioned surfaces are on the same level as the upper surfaces of the peripheral lands. There is a feed pipe 32 for oil to the element 1. Inside the element, a branched channel 33 has been drilled, which has an outlet orifice 26 in the pocket 15 and an outlet orifice 28 in the pocket 17. The peripheral pockets in all of the throttle parts each have an outlet orifice 23, 24 and 25, respectively. Each of the outlet orifices 23, 24 and 25 constitute one end of a drilled channel 34 and 35, respectively, which are not connected together. The channel 35 emerges into the pocket 6, and the channel 34 into the pocket 4. The inlet 11 is also connected to a channel which emerges into a throttle part located on the other side, the throttle part 13, and the outlet orifice 24 of the throttle part 13 emerges into a pocket opposite the pocket 5. For the two pairs of throttle part and pocket forming a slide cushion in the right end of the element there is a feed pipe 36.

If an elongate machine element of the kind now described is arranged between two vertical walls, in order to achieve guidance of the element, the maintaning of slide cushions of the same thickness functions in the following way. Pressure medium is fed to the pipe 32, and from there to th pocket 15 and the pocket 17, respectively. If the element is correctly centered in relation to the vertical walls, equal quantities of oil, with the same pressure, will flow out through the two inlet orifices 26 and 28. If the throttle at part 12 is regarded, this will be sufficient, as the situation at part 14 is identical. Thus, pressure medium now flows through the inlet orifice 26 into the pocket 15, and thereafter between the space formed by the flat upper surface of the raised part of the periphery and the surrounding guide wall into the peripheral pocket 20. From this pocket a small portion flows as leakage over the peripheral surface 29, and the rest of the pressure medium through the outlet orifice 23, the channel 35 and into the pocket 6, and there, on its surrounding surface forms a peripheral slide cushion of pressure medium. If now, for any reason, the distance between the upper surface of the peripheral raised section 17A and the opposite vertical guide wall should be less than the corresponding distance at part 14, the peripheral raised section 17A will throttle down and thereby give a lower pressure in the channel 35 and, accordingly, in the pocket 6, but there will be a lesser throttling and, consequently, an increase of the pressure in the pocket 4 at part 14, and the element will then be caused to assume a centered position in relation to its vertical walls, since the force from the pressure maintaining the pockets 4 and 6 is greater than the force from the throttling part. In the same way, the pair of the throttle at the part 13 and the pocket 5 will function together with the corresponding pair located on side 3 of the machine element. Along the length of the machine element, two pairs consisting of throttle and pocket have thus been arranged, but it should be obvious that more pairs can be arranged along the length of the element if this should be desired.

FIG. 3 shows a machine element of exactly the same kind as is shown in FIGS. 1 and 2. The only difference is that the throttle and pocket forming the slide cushion have been arranged on two horizontal surfaces. This figure also shows how two paris of centering parts have been arranged at either end of the element, each pair then consisting of a throttle and a pocket for achieving a slide cushion. In this case it is the intention that the element is to be throttled between two horizontal walls. The element has here been given the reference designation 1'. The upper horizontal surface has been given the reference designation 37 and the other the reference designation 38. The three pockets shown for forming slide cushions have been given the reference designations 39, 40 and 43, the throttle parts the reference designations 41, 42 and 44, and drilled channels the reference designations 45, 46 and 47, which channels are not connected with each other. The element will be guided in exactly the same way between its two horizontal walls as the element shown in FIG. 1 was guided between its vertical walls.

FIG. 4 shows an element 1", which is intended to be guided between four walls. In other words, this element constitutes a combination of those shown in FIGS. 1 and 3. In the figure there is shown a feed pipe for pressure medium 32″. The feed pipe 32″ is connected to a driller channel 33″ in the element, which supplies pressure medium to four throttle parts 12″ and 41″ and their opposite throttel parts. To the right of these throttles there are four pockets 4″ and 39″, which coact with said throttles in the way previously described, with the aid of the drilled channels 46″ and 47″. At the right end of the element there are also shown four pockets 5″ and 40″ for forming slide cushions, and four throttle parts 13″ and 42″. For the last-mentioned centered units, the supply of pressure medium is arranged through the pipe 36″. The channels 34″, 46″ and 47″ and the corresponding pipes are not connected with each other.

FIG. 5 shows a practical application of the machine elements described in the foregoing. Thus, 48 is a table which is intended to have a reciprocating movement and which is intended to be suitably arranged at a machine tool. The turret of a turret lathe, for instance, can be mounted on the table. On its under side, the table is provided with longitudinal flanges 49 and 50, which are fixed to the table. On the under sides of each of the flanges, elements according to the foregoing figures are attached, and said elements, which here have been given the reference designations 51 and 52, each run in its four-walled groove 53 and 54, respectively. The centering parts on the over and under sides of the elements 51 and 52 function in the same way as described with reference to FIG. 3. As regards the guidance horizontally of the elements 51 and 52, this takes place in the same way as shown in FIG. 1. The above-mentioned grooves 53 and 54 are arranged in a support 55.

FIG. 7 shows a cylindrical member 56. Along its peripheral surface it is provided with pairs arranged one after the other, divided up into two series, which are arranged along one periphery each, 57 and 58. Each pair consists of a throttle and a pocket for forming a slide cushion, arranged one after the other. In the figure there are thus shown three pairs along a first peripheral line. The same applies to the pairs along the second peripheral line. There can thus be seen along the first peripheral line a throttle 59 and two pockets 60 and 61 forming slide cushions, and along the second peripheral line two throttles 62 and 63 and a pocket 64 forming a slide cushion. The throttle 59 consists of a pocket 65, a raised section 66 of the periphery, a pocket 67 containing an outlet, and a peripheral raised section 67A which serves as a seal. The pocket 65 contains an inlet. The two pockets 60 and 61 each have an inlet 68 and 69, respectively. The throttle 62 has a pocket 70 with inlet, a peripheral raised section 71, a peripheral pocket 72 with an outlet and a peripheral raised section 72A serving as a seal. The pocket 64 has an inlet 73. For the three pairs along the two peripheries, it is considered appropriate to arrange in each periphery so that each pair is located at a distance of 120° in relation to each other.

FIG. 8 shows how the channels for the first series of throttles and pockets for forming slide cushions are arranged. The channel 75 emerges into the pocket 65. The channel 76 emerges into the pocket for the throttle which is located diametrically opposite the pocket 61, and the channel 77 emerges into the pocket for the throttle which is diametrically opposite the pocket 60. The peripheral pocket 67 is connected with the channel 78, which connects the pocket with the diametrically opposite pocket for forming a slide cushion. The channel 69 is connected with the peripheral pocket for the throttle which is opposite the pocket 61. In the same way, the channel 68 is connected with the throttle diametrically opposite the pocket 60.

From the foregoing, it will be noted that it has been possible to achieve slide cushion suspension of machine elements which are either rotatable or movable in such a way that they are self-centering, the throttles which are required in order to achieve these slide cushion suspension arrangements then being without any moving parts and utilizing the peripheral wall of the machine element and the guide wall facing same, and the throttle being adjacent to a pocket for forming the slide cushion. Such a pair coacts with a second pair with cross connection, which involves that the throttle at a pocket feeds pressure medium to the pocket adjacent to the throttle in the second pair. This combination of two cross-connected pairs can be used for a plurality of applications further to those described in the foregoing.

By using self-centering of the above-mentioned kind, since the arrangement only consists of drilled channels and surfaces, the great advantage is gained that no assembly work is required in order to achieve the throttles, that no incorrect after-adjustments of the throttles can be made and, further, that the throttles, owing to their large periphery are insensitive to small particles of foreign matter, and since the element with throttles is intended to be in motion while in operation, particles of foreigh matter, if any, will pass through the throttle together with the medium.

In the foregoing, it has been indicated that milled recesses have been made for the pockets and the throttles in the movable elements, but is should be obvious that these recesses can also be made in the surrounding walls, and the movable elements will then have entirely smooth surfaces.

I claim:

1. The combination comprising first and second machine members adapted for movement relative to one another, said members having confronting guide surfaces, at least first and second pairs of throttles and pockets in the guide surface of one of said members adapted to confront the guide surfaces of the other member, each throttle having a central cavity surrounded by a raised land, a groove surrounding the central cavity outboard of the land and a second land surface surrounding said groove defining a seal, said central cavity, groove and lands defining a slide cushion, a pocket adjacent said throttle surrounded by a raised sections, inlet channel means communicating with said cavities and a fluid source under pressure, conduit means connecting the groove of said first throttle with said second pocket, and conduit means connecting the groove of said second throttle with said first pocket.

2. The combination as claimed in claim 1 wherein said first machine member has at least one pair of spaced apart first guide surfaces and said second machine member has at least one pair of second guide surfaces, the guide surfaces of said first and second members being in confronting relation and wherein at least one pair of throttles and pockets is disposed in each of the confronting guide surfaces of one of said machine members.

3. The combination as claimed in claim 1 wherein said first machine member is an elongated member and has at least a pair of spaced generally parallel first guide surfaces confronting at least a pair of spaced generally parallel second guide surfaces of said second machine member adapted for movement relative to said first machine member and wherein at least one pair of throttles and pockets is disposed in the guide surfaces of said first machine member.

4. The combination as claimed in claim 3 wherein pairs of throttles and pockets are disposed in the opposed first guide surfaces of said elongated first machine member adjacent opposite terminal ends thereof.

5. The combination as claimed in claim 3 wherein the first and second guide surfaces are planar and generally parallel to one another.

6. The combination as claimed in claim 3 wherein the first and second guide surfaces are arcuate and closely spaced relative to one another.

* * * * *